United States Patent [19]

Schulz et al.

[11] Patent Number: 4,801,401

[45] Date of Patent: Jan. 31, 1989

[54] PROCESS FOR THE PRODUCTION OF A FOAM INHIBITOR MIXTURE

[75] Inventors: Paul Schulz, Wuppertal; Martin Witthaus, Duesseldorf; Juergen Waldmann, Monheim, all of Fed. Rep. of Germany

[73] Assignee: Henkel Kommanditsegellschaft auf Aktien, Duesseldorf, Fed. Rep. of Germany

[21] Appl. No.: 22,470

[22] Filed: Mar. 6, 1987

[30] Foreign Application Priority Data

Mar. 8, 1986 [DE] Fed. Rep. of Germany ....... 3607674

[51] Int. Cl.$^4$ .............................................. C11D 10/00
[52] U.S. Cl. ................................ 252/358; 252/174.15
[58] Field of Search ..................... 252/358, 321, 174.15

[56] References Cited

U.S. PATENT DOCUMENTS

| | | | |
|---|---|---|---|
| 2,993,809 | 7/1961 | Bueche et al. | 117/100 |
| 3,388,073 | 6/1968 | Domba | 252/321 |
| 3,591,519 | 7/1971 | Boylan | 252/358 |
| 4,021,365 | 5/1977 | Sinka | 252/358 |
| 4,032,473 | 6/1977 | Berg | 252/358 |
| 4,082,691 | 4/1978 | Berger | 252/358 |
| 4,101,443 | 7/1978 | Rosen | 252/358 |
| 4,421,666 | 12/1983 | Hempel et al. | 252/140 |
| 4,599,189 | 7/1986 | Wuhrmann | 252/174.15 |

FOREIGN PATENT DOCUMENTS

| | | | |
|---|---|---|---|
| 8829 | 3/1980 | European Pat. Off. | |
| 91802 | 10/1983 | European Pat. Off. | 252/174.15 |
| 2227146 | 12/1973 | Fed. Rep. of Germany | |

*Primary Examiner*—Matthew A. Thexton
*Assistant Examiner*—Catherine S. Kilby
*Attorney, Agent, or Firm*—Ernest G. Szoke; Henry E. Millson, Jr.; Real J. Grandmaison

[57] ABSTRACT

To prepare a highly effective foam inhibitor mixture consisting of paraffin hydrocarbons, hydrophobicized silica and liquid paraffin hydrocarbons, a finely divided silica is dispersed in paraffin hydrocarbons melting above 40° C. and reacted with alkyl trichlorosilanes wherein the alkyl groups contain from 4 to 22 carbon atoms.

10 Claims, No Drawings

PROCESS FOR THE PRODUCTION OF A FOAM INHIBITOR MIXTURE

BACKGROUND OF THE INVENTION

1. Field of the Invention

This invention relates to a process for the production of a foam inhibitor mixture consisting of hydrophobicized silica and paraffin hydrocarbons by reaction of hydrophilic silica dispersed in the paraffin hydrocarbons with alkyl chlorosilanes.

2. Discussion of Related Art

Foam inhibitor mixtures of paraffin hydrocarbons and hydrophobicized, i.e. silanized, silica are known and are widely used. One application known from European Patent 8 829 is in foaming detergents. However, it has been found that mixtures of paraffin hydrocarbons and hydrophobicized silica prepared beforehand often show only limited stability in storage which cannot be improved to the necessary extent even by blending.

In U.S. Pat. No. 3,388,073, it is proposed to prepare these mixtures "in situ", for which purpose the hydrophilic silica serving as starting material is dispersed in a liquid paraffin hydrocarbon, reacted with dialkyl dichlorosilane and the mixtures obtained directly used as such after removal of the hydrogen chloride. The alkyl groups in the dialkyl dichlorosilanes are said to contain no more than 4 carbon atoms and preferably consist of methyl groups. The hydrophilicized silica contains cyclic siloxane residues. It has been found that the foam-inhibiting properties of the mixtures obtained are inadequate for numerous applications, particularly high-foam surfactants and detergents.

In U.S. Pat. No. 4,082,691, it is proposed to carry out the reaction of the silica dispersed in the paraffin hydrocarbons in two stages, alkyl trichlorosilanes being used in the first stage and dialkyl dichlorosilanes in the second stage. The alkyl groups in these chlorosilanes may contain from 1 to 18 carbon atoms or may be cycloaliphatic, although the dichlorosilanes preferably contain methyl groups while the trichlorosilanes preferably contain long-chain alkyl groups. The patent specification teaches that only a two-stage reaction with a molar ratio of dichlorosilane to trichlorosilane of from 1:1 to 1:5 leads to useful foam inhibitors. Molar ratios below or above this range lead to unsuitable foam inhibitors. In addition, the temperature of the reaction mixture on addition of the chlorosilanes should be below 50° C., and preferably below 40° C. The use of paraffin hydrocarbons, particularly microwaxes, which melt above 50° C. that temperature is thus out of the question.

Therefore, an object of the present invention s to provide an "in situ" process for the production of mixtures of paraffin hydrocarbons and silanized silica which enables relatively high-melting paraffins characterized by a particularly good foam-inhibiting effect to be jointly used and which leads in a single-stage, and hence simplified procedure, to products having a superior foam-inhibiting effect.

DESCRIPTION OF THE INVENTION

Other than in the operating examples, or where otherwise indicated, all numbers expressing quantities of ingredients or reaction conditions used herein are to be understood as modified in all instances by the term "about".

Accordingly, the present invention relates to a process for the production of foam inhibitor mixtures of paraffin hydrocarbons and hydrophobicized silica by reaction of a hydrophilic silica dispersed in liquid paraffin hydrocarbons with alkyl chlorosilanes with removal of the hydrogen chloride formed, wherein the silica, which is dispersed in paraffin hydrocarbons melting above 40° C., is reacted with alkyl trichlorosilanes wherein the alkyl groups contain from 4 to 22 carbon atoms.

Suitable silica starting materials include hydrophilic silicas of the type obtainable in known manner by precipitation from aqueous solutions of alkali metal silicates or from silica sols (so-called precipitated silica). Silica products obtained by hydrolysis of silicon tetrachloride in the vapor phase may also be used. Precipitated silicas are preferably used. Silicas such as these normally have a particle size of approximately 5 to 100 nm (nanometers) and preferably of from 10 to 50 nm, and a specific surface area of from 50 to 400 m$^2$/g (square meters per gram) and preferably of from 100 to 350 m$^2$/g.

In accordance with the invention, the silica is dispersed in a paraffin matrix. The proportion of silica, based on the mixture, may amount to between 0.5 and 22% by weight and preferably to between 1 and 18% by weight. Paraffins and paraffin mixtures melting at temperatures above 40° C., and more particularly above 50° C., are suitable as the paraffin matrix. These relatively high-melting products include hard paraffin, microcrystalline waxes and mixtures thereof. By virtue of their particular effectiveness as foam inhibitors, microcrystalline waxes and mixtures thereof with other paraffin hydrocarbons are preferably used. For example, soft paraffins or vaseline and, in some cases, even paraffin oils have proved to be suitable mixing components, specially since it has been found that, in mixtures such as these, the comparatively more expensive microparaffins may be replaced to a considerable extent by lower-melting paraffins of this type without any significant deterioration in the intended foam-inhibiting effect. Accordingly, mixtures comprising from 90 to 25%, and more especially from 75 to 35% microparaffins, and from 10 to 75% and more especially from 25 to 65% hard or soft paraffins, vaseline or petrolatum, or mixtures thereof, may also be used with advantage.

Suitable microparaffins normally melt between 55° C. and 95° C., while hard paraffins normally melt between 38° C. and 60° C. Vaseline and petrolatum are liquid to semi-solid at room temperature. Low molecular weight paraffins having a solidification point below 10° C. contribute only little to the foam-inhibiting effect, although they may be used to adjust the rheology or the melting behavior of the mixtures.

Where it is desired to produce decidedly inexpensive foam inhibitors, the use of microcrystalline waxes may even be dispensed with. In many applications, the slight loss of foam-inhibiting effect which this may involve is entirely acceptable or may be compensated for by a slightly higher dosage of foam inhibitor.

The hydrophilic silica is dispersed in the liquid paraffin matrix heated to temperatures above its melting point, preferably using effective stirrers. The temperature should be above 40° C., and preferably above 50° C., and more especially in the range of from 60° C. to 140° C. An inert gas, for example nitrogen, is best introduced into the liquid paraffin before or during the addition to displace any oxygen present. The introduction of nitrogen is best continued during the following reaction or periodically repeated to promote removal of the hydrogen halide.

The alkyl trichlorosilanes used in this invention are those containing from 4 to 22 carbon atoms, and preferably from 6 to 18 carbon atoms. Products having linear alkyl chains are generally distinguished from those having a branched or cyclic chain by a superior effect and are therefore preferred. Examples of preferred alkyl groups are hexyl, heptyl, octyl, nonyl, decyl, undecyl, dodecyl, tridecyl, tetradecyl, hexadecyl, and octadecyl radicals and mixtures thereof. In special cases, i.e. for special high-foam surfactant combinations, it may be of advantage to use certain branched or even cyclic alkyl radicals or combinations or branched and cyclic alkyl radicals.

The radio of silica to alkyl trichlorosilane depends upon the number of active, i.e. substitutable, hydroxyl groups in the silica. It is best to use an active precipitated silica which should not be too highly heated and, in particular, should not be calcined before use. In general, from 0.01 and 0.3 mole, and preferably from 0.05 to 0.15 mole, of alkyl trichlorosilane is used per mole of silica. A feature which characterizes the silica used in this connection is its water content which is determined by a special method. To this end, approximately 2 g of the silica are weighed into a microprocessor balance surmounted by a drying unit (Sartorius MP8 with drying gun), subsequently heated for 10 minutes to 245° C., and the weight loss determined. The trichlorosilane used on the basis of this water content amounts to between 0.04 and 1.2 moles, and preferably to between 0.2 and 0.6 mole of trichlorosilane per mole of water.

The alkyl trichlorosilane may be directly added to the paraffin-silica mixture heated, for example, to a temperature of from 70° C. to 140° C. Where the proportion of silica in the paraffin matrix significantly exceeds 2 to 3% and corresponding quantities of silane have to be added, the addition of the alkyl trichlorosilane is best made over a period of from 10 to 30 minutes. It is of advantage to begin the hydrophobicizing process at a relatively high temperature, for example 100 to 140° C., and, after addition of about 10 to 40% and preferably 20 to 30% of the total quantity to be used, to reduce the temperature in steps to 100° C.–70° C. and preferably to 90° C.–80° C. To complete the reaction, this temperature is maintained for 1.5 to 4 hours.

In an equally preferred embodiment of the process, the high initial viscosity of the mixture observed with relatively large additions of silica is avoided by successively introducing the precipitated silica into the paraffin melt in two or more portions and reacting each portion with approximately 10 to 40% of the total quantity of alkyl trichlorosilane to be used before the following portion is added. In this embodiment of the process there is no need for the initial reaction temperature to be increased, the main reaction and the following reaction taking place at the same temperature, generally in the range from 70° to 100° C.

The mixture is then heated for a while, for example for 0.5 to 1.5 hours, to a temperature of 110° to 220° C., and preferably 120° C. to 150° C., and the residues of hydrogen chloride are removed by passing nitrogen through and/or by applying reduced pressure to the mixture. Throughout the reaction and the aftertreatment, the reaction mixture is intensively stirred by suitable stirrers. The reaction product obtained on completion of the reaction and cooled to room temperature is substantially free from hydrogen chloride and forms a storable dispersion even without any further addition.

Neutral mixtures completely free from HCl are obtained by aftertreatment of the product melt with basic, paraffin-soluble compounds, preferably relatively long-chain alkyl amines, for example cocosamine. The effect of additions of from 0.2 to 5% and preferably of from 0.5 to 2% of cocosamine is that even products degassed under relatively mild conditions, for example 120° C./70 mbar, thereafter contain no more free hydrogen chloride. The addition of alkyl amines does not adversely affect the foam-inhibiting capacity. Products treated therewith, in the same way as the starting mixture, are chemically stable for at least two weeks at 100° C. in the presence of air, i.e. they may be stored even in molten form.

The dispersions obtained may be directly used as foam inhibitors. For certain applications, they may even be provided with additives or diluted with diluents or inert solvents. Foam inhibitors intended for use in powder-form or granular products, for example in detergents and cleaning preparations, may even by applied to, or incorporated in, an inert carrier material or adsorbent. Suitable carrier materials are, for example, sodium sulfate, sodium carbonate, sodium silicate, sodium phosphate and polyphosphate, magnesium oxide, magnesium carbonate, magnesium silicate, calcium carbonate, aluminum oxide, zeolite or even mixtures of these carrier materials. These carrier materials are preferably present in a loose, absorbent form, as obtained for example in the spraying and drying of an aqueous solution or suspension. Organic binders, such as cellulose, starch, cellulose and starch ethers, polyglycols or other water-soluble or water-dispersible polymers or fatty alcohol or oxoalcohol ethoxylates, are also suitable as carrier materials or may be combined with the above-mentioned inorganic carrier materials. By virtue of the high stability in storage and permanence of effect of the products obtained by the process according to the invention, there is also no need, for example, for the foam inhibitor particles to be additionally coated or encapsulated.

Accordingly, the present invention also relates to preparations, more especially of the type described above, which contain the products obtained by the process according to this invention. The content of the process products in preparations such as these may vary within wide limits, depending on the absorbency of the carrier material and the field of application. Easy-to-handle, i.e. dosable, preparations generally contain from 1 to 30% by weight and preferably from 2 to 20% by weight of process product.

Application for the foam inhibitors are, in particular, with detergents and cleaning preparations and also textile auxiliaries, polymer solutions and dispersions, of the type used for example in the adhesives field and paint field, and quite generally chemical process engineering, the food industry and paper manufacture. By virtue of their high effectiveness, the process products generally need to be added in only small quantities.

EXAMPLE 1

647 g of a microcrystalline paraffin (Witcodur 272 ®) having a melting range of 83° to 88° C., 500 g of a hard paraffin having a melting range of 42° to 48° C., and 147 g of vaseline (petrolatum) were melted and heated to 80° C. After purging with nitrogen, the temperature of the mixture was increased to 120° C. and 176.5 g of a precipitated silica were introduced with stirring. After complete homogenization, 105.9 g of n-octyl trichlorosilane were mixed in the mixture over a period of 230 minutes, the temperature being lowered in steps to 80° C. after about 20% of the total quantity of alkyl chlorosilane had been added. The mixture was then heated to 190° C. while more nitrogen was introduced and, thereafter, was freed from remaining traces of hydrogen chloride by stirring for 1 hour under a pressure of 1 mbar. The weight loss of hydrogen chloride and small volatile fractions was 35.0 g. After cooling to room temperature, the product solidified into a wax-like mass.

For blending, the molten product was mixed with loose, sprayed sodium sulfate in a high-speed ploughshare mixer. To this end, 167 g of the product were applied in 1 minute to 1.5 kg of the sodium sulfate preheated to 90° C., followed by mixing for another 3 minutes. After cooling to room temperature, a free-flowing powder having an active substance content of approx. 10% and a powder density of 550 g/l was obtained.

Storage test

A mixture of 1.5% by weight of the foam inhibitor preparation obtained with 98.5% by weight of a commercial granular detergent (Dixan) was stored for 8 weeks in a conditioning cabinet at 30° C./80% relative air humidity. At the end of this period, there was no discernible reduction in the foam-inhibiting effect of the foam inhibitor in relation to the initial value.

A mixture which had been obtained by mixing the same paraffin mixture with a commercial silanized silica developed for this purpose in the same mixing ratios was used for comparison. During the storage period, the foam inhibitor was largely inactivated so that, in a washing test under comparable conditions, overfoaming occurred with an approximately 20% loss of wash liquor.

EXAMPLE 2

440 kg of microwax and 440 kg of vaseline as in Example 1 were introduced in molten form from heated containers into a 2 m$^3$ capacity enamel vessel and homogenized at 80° C. 120 kg of precipitated silica (FK 383, a product of DEGUSSA) was introduced into the vessel in two equal portions. After addition and homogeneous dispersion of the first portion, 5 kg of n-dodecyl trichlorosilane were added. After 5 minutes, the remaining 60 kg of silica were introduced and another 61.4 kg of the alkyl trichlorosilane was pumped in the mixture over a period of 20 minutes. The temperature was kept constant at 80° C. for another 60 minutes with stirring of the mixture. The mixture was then degassed for 30 minutes at 120° C./50 mbar. After the mixture had been cooled to 100° C., 20 kg (corresponding to 2% by weight) of cocosamine were added. The product was stored in molten form at 80 to 100° C. pending further processing. A 10% mixture with a spray-dried hollow-bead powder (carrier bead) consisting essentially of sodium sulfate, zeolite, polyacrylate and modified cellulose, produced a concentrate which proved stable in detergents of high nonionic surfactant content under rigorous storage conditions, i.e. storage for several weeks in a conditioning cabinet.

We claim:

1. A defoaming composition of matter consisting essentially of a hydrophobicized silica dispersed in a paraffin having a melting point above about 50° C., said composition having been prepared by a method comprising reacting a hydrophilic silica dispersed in melted paraffin with an alkyl trichlorosilane wherein the alkyl group contains from about 4 to about 22 carbon atoms, and removing therefrom the hydrogen chloride formed during the reaction.

2. A defoaming composition of matter as in claim 1 wherein said silica is present in an amount of from about 0.5 to about 22% by weight, based on the weight of said composition.

3. A defoaming composition of matter as in claim 1 wherein from about 0.01 to about 0.3 mole of said alkyl trichlorosilane was used per mole of said silica.

4. A defoaming composition of matter as in claim 1 wherein said paraffin is selected from microparaffins and mixtures thereof with hard paraffins and/or soft paraffins and/or paraffin oils.

5. A defoaming composition of matter as in claim 21 wherein said composition has been treated with a paraffin-soluble long-chain amine to neutralize residues of chlorinated hydrocarbon formed in said composition.

6. A defoaming composition of matter as in claim 1 wherein an inert gas has been introduced into said paraffin before, during, or after the addition of said silica to said composition.

7. A defoaming composition of matter as in claim 1 mixed with a water-soluble or water-dispersible carrier.

8. A defoaming composition of matter as in claim 7 wherein said carrier is selected from an inorganic and organic material.

9. A defoaming composition of matter as in claim 1 mixed with a detergent composition in an amount effective to reduce the foaming of said detergent composition.

10. A defoaming detergent comprising:
 (A) a dishwashing detergent component; and
 (B) a defoaming composition of matter consisting essentially of a hydrophobicized silica dispersed in a paraffin having a melting point above about 50° C., said composition having been prepared by a method comprising reacting a hydrophilic silica dispersed in melted paraffin with an alkyl trichlorosilane wherein the alkyl group contains from about 4 to about 22 carbon atoms, and removing therefrom the hydrogen chloride formed during the reaction.

* * * * *